United States Patent
Padovan

(10) Patent No.: US 10,828,588 B2
(45) Date of Patent: Nov. 10, 2020

(54) GAS LIQUID SEPARATOR

(71) Applicant: General Electric Technology GmbH, Baden (CH)

(72) Inventor: Loris Padovan, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 14/963,612

(22) Filed: Dec. 9, 2015

(65) Prior Publication Data

US 2016/0175750 A1 Jun. 23, 2016

(30) Foreign Application Priority Data

Dec. 17, 2014 (EP) .................... 14198418

(51) Int. Cl.
| | | |
|---|---|---|
| *B01D 45/00* | (2006.01) | |
| *B01D 45/08* | (2006.01) | |
| *F22B 37/26* | (2006.01) | |
| *F22B 37/30* | (2006.01) | |
| *B01D 45/06* | (2006.01) | |
| *B01D 50/00* | (2006.01) | |

(52) U.S. Cl.
CPC ............ *B01D 45/08* (2013.01); *B01D 45/06* (2013.01); *F22B 37/26* (2013.01); *F22B 37/30* (2013.01); *B01D 50/002* (2013.01)

(58) Field of Classification Search
CPC ........ B01D 45/08; B01D 45/16; B01D 45/12; B01D 50/002; B01D 45/06; F22B 37/26
See application file for complete search history.

(56) References Cited

U.S. PATENT DOCUMENTS

| | | | | |
|---|---|---|---|---|
| 3,338,035 A | * | 8/1967 | Dinkelacker | B01D 45/08 55/440 |
| 3,358,580 A | * | 12/1967 | Freese | B01D 45/08 454/277 |
| 3,751,886 A | | 8/1973 | Sokolowski | |
| 3,870,488 A | * | 3/1975 | Arndt | B01D 45/08 55/440 |

(Continued)

FOREIGN PATENT DOCUMENTS

| | | |
|---|---|---|
| DE | 42 14 094 C1 | 9/1993 |
| EP | 0 178 515 A2 | 4/1986 |

(Continued)

OTHER PUBLICATIONS

Wu et al.,Aerodynamic Effects on Primary and Secondary Spray Breakup,Liquid rocket Engine Combustion Instability Progress in Aeronautics and Astronautics,pp. 247-279,1995.

(Continued)

*Primary Examiner* — Dung H Bui

(74) *Attorney, Agent, or Firm* — Grogan, Tuccillo & Vanderleeden, LLP

(57) ABSTRACT

The invention relates to a gas liquid separator, for separating liquid droplets from a gas flowing generally in a main gas flow direction through the gas liquid separator. The gas liquid separator comprises a plurality of plates, mutually parallel and spaced apart to form a flow channel there between. Each plate having a plurality of corrugations wherein at least one of the corrugations has an extrados wing profile shaped camber.

10 Claims, 2 Drawing Sheets

(56) References Cited

U.S. PATENT DOCUMENTS

| | | | | |
|---|---|---|---|---|
| 3,912,471 A * | 10/1975 | Cotton, Jr. | ............. | B01D 45/08 55/440 |
| 3,953,183 A * | 4/1976 | Regehr | ................ | B01D 45/08 55/440 |
| 4,072,478 A * | 2/1978 | Regehr | ................ | B01D 45/16 55/440 |
| 4,198,215 A * | 4/1980 | Regehr | ................ | B01D 45/08 55/440 |
| D272,181 S * | 1/1984 | Sixsmith | ...................... | D23/413 |
| 4,430,101 A * | 2/1984 | Sixsmith | ............... | B01D 45/06 55/440 |
| 4,508,552 A * | 4/1985 | Ovard | ...................... | F28C 1/16 55/440 |
| 4,530,707 A * | 7/1985 | Ovard | ...................... | F28C 1/16 55/440 |
| 4,557,740 A * | 12/1985 | Smith | ................... | B01D 45/06 55/440 |
| 4,581,051 A * | 4/1986 | Regehr | ................ | B01D 45/16 55/440 |
| 4,601,731 A | 7/1986 | Michelson | | |
| 4,802,901 A * | 2/1989 | Wurz | ................... | B01D 45/06 55/440 |
| 5,104,431 A * | 4/1992 | Fewel, Jr. | ............. | B01D 45/08 55/440 |
| 5,268,011 A * | 12/1993 | Wurz | ................... | B01D 45/08 55/294 |
| 5,269,823 A * | 12/1993 | Wurz | ................... | B01D 45/16 55/440 |
| 5,839,244 A * | 11/1998 | Johnson | ................. | F24F 13/08 454/224 |
| 5,972,062 A * | 10/1999 | Zimmermann | ........ | B01D 45/08 55/440 |
| 6,149,515 A * | 11/2000 | Van Becelaere | ...... | F24F 13/075 454/277 |
| 2007/0137154 A1 * | 6/2007 | Agnello | ................. | B01D 45/08 55/440 |
| 2010/0326026 A1 * | 12/2010 | Bratton | .................. | B01D 45/06 55/440 |
| 2015/0135661 A1 * | 5/2015 | MacDonald | .......... | F24F 13/082 55/440 |

FOREIGN PATENT DOCUMENTS

| | | |
|---|---|---|
| FR | 1 361 634 A | 5/1964 |
| GB | 2489511 A | 10/2012 |

OTHER PUBLICATIONS

Austrheim et al., Re-entrainment correlations for demisting cyclones acting at elevated pressures on range of fluids, Dept. of Physics and Technology, University of Bergen, Alegt. 55, 5007 Bergen Norway, 2007.

Fuglede et al., MAE 440—Aerodynamics Laboratory. Experimental Comparison of Drag of a Golf Ball with Smooth Ball, California State University, Department of Mechanical and Aerospace Engineering, May 20, 2007.

Scott, "Golf Ball Dimples & Drag", Feb. 13, 2005, retrieved from "http://www.aerospaceweb.org/question/aerodynamics/q0215.shtml" on Nov. 2, 2016.

* cited by examiner

GAS LIQUID SEPARATOR

CROSS-REFERENCE TO RELATED APPLICATIONS

This application claims priority to European Patent application 14198418.7 filed Dec. 17, 2014, the contents of which are hereby incorporated in its entirety.

TECHNICAL FIELD

The present relates to moisture and/or mist separators for separating a liquid, such as water droplets from a gas, such as steam.

BACKGROUND

A moisture separator, also known as droplets separator, is a device for separating water droplets from steam. Moisture separators are widely used in the power industry as well as oil and gas industry to remove liquid droplets from a gas or steam. In general mist removal is necessary for several reasons, as explained below.

One reason is to increase the cycle efficiency of a power plant. Usually, in thermal power plants, the steam generated from a boiler is expanded several times in so called high, middle and low pressure turbines. In a Nuclear Power Plant, during the first expansion in the high pressure turbine nucleation phenomena occurs in the high pressure turbine resulting in the exhaust of humid steam. For reasons of efficiency, before re-heating the humid steam, it may be advantageous to mechanical separate water from the saturated steam so that the working fluid sent to re-heater bundles is humid steam with low moisture content. Since the latent heat of evaporation of water is significantly high, it is preferred to eliminate the water content in the humid steam and send the collected water back in the thermodynamic cycle instead of using a lot of energy for the moisture evaporation thereby limiting thermal loads on the bundles, as well, caused by the evaporation processes.

Another benefit achieved by removing the moisture content is the protection of downstream equipment from erosion damages. One type of moisture separators widely used in the oil and gas industries as well as power generation industry is a so-called wave-plate mist eliminators. This type of separator uses the principle of inertia, whereby larger water droplets tend to continue in a straight line when the direction of flow of an air/steam stream carrying the water droplets is changed. These wave-plate mist eliminators comprise a plurality of narrowly spaced wave-shaped or corrugated metal sheets, oriented in line with the air/steam flow path. The two-phase flow (mixture of steam and water droplets) is forced to travel through the tortuous channels and to change repeatedly flow direction. The water droplets, that due to their inertia are not able to follow these changes in direction, deviate from the main flow and impact on the channel walls, where they adhere and coalesce. When the amount of liquid is sufficiently high a film and liquid rivulets are formed, which are continuously drained out from the wave-plate mist eliminator by gravity. The inertia of the drops and the drag of the steam control the motion of the drops through the channels.

During the design process of these kinds of separators it is typically advantageous to find a configuration which minimizes, as much as possible, pressure loss as this has a direct effect on the energy efficiency of the power plant as a whole. Moreover, by increasing the separation efficiency of a single separator channel, the whole separator panel can be reduced in size and consequently, if a moisture separator reheater is used, the moisture separator reheater can be made a smaller and cheaper. There is therefore a continuous need to seek new ways to overcome these problems.

SUMMARY

A gas liquid separator is disclosed that can provide improved water separation performance and low pressure loss.

It attempts to address this problem by means of the subject matter of the independent claim. Advantageous embodiments are given in the dependent claims.

The disclosure is based on the general idea of providing a corrugated plate gas liquid separator designed in order to delay the separation point of the main gas flow from the walls through the separator after each corrugation peak.

One general aspect includes a gas liquid separator, for separating liquid droplets from a gas flowing generally in a main gas flow direction through the gasliquid separator. The gasliquid separator comprising a plurality of plates that are mutually parallel and spaced apart to form a flow channel. Each of the plurality of plates has a plurality of corrugations wherein at least one of the corrugations has a extrados wing profile shaped camber.

Further aspects may include one or more of the following features. Corrugations comprising a series of extrados wing profile shaped camber. The gas liquid separator configured such that in the main gas flow direction the plurality of plates are free of straight sections. At least one of the corrugations includes an extrados surface derived from a National Advisory Committee for Aeronautics (NACA) airfoil configuration. The plurality of plates including grooves orthogonal to the main gas flow direction, configured as drainage grooves. The grooves have, as well, the effect of increasing the energy of the turbulent boundary layer developing at the wall, thus helping the flow to remain attached at the wall and consequently delaying further the flow separation point.

The gas liquid separator may be configured as a steam water separator.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
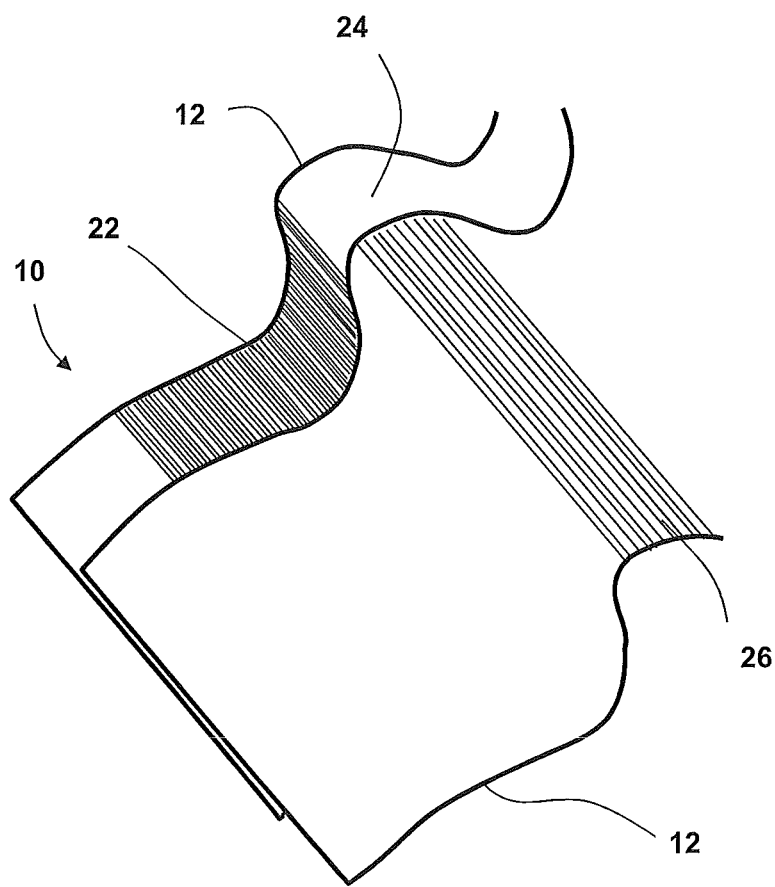
FIG. 1 is side perspective view of two plates of an exemplary embodiment of a gas liquid separator of the disclosure.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiments disclosed herein.

Figure 2:
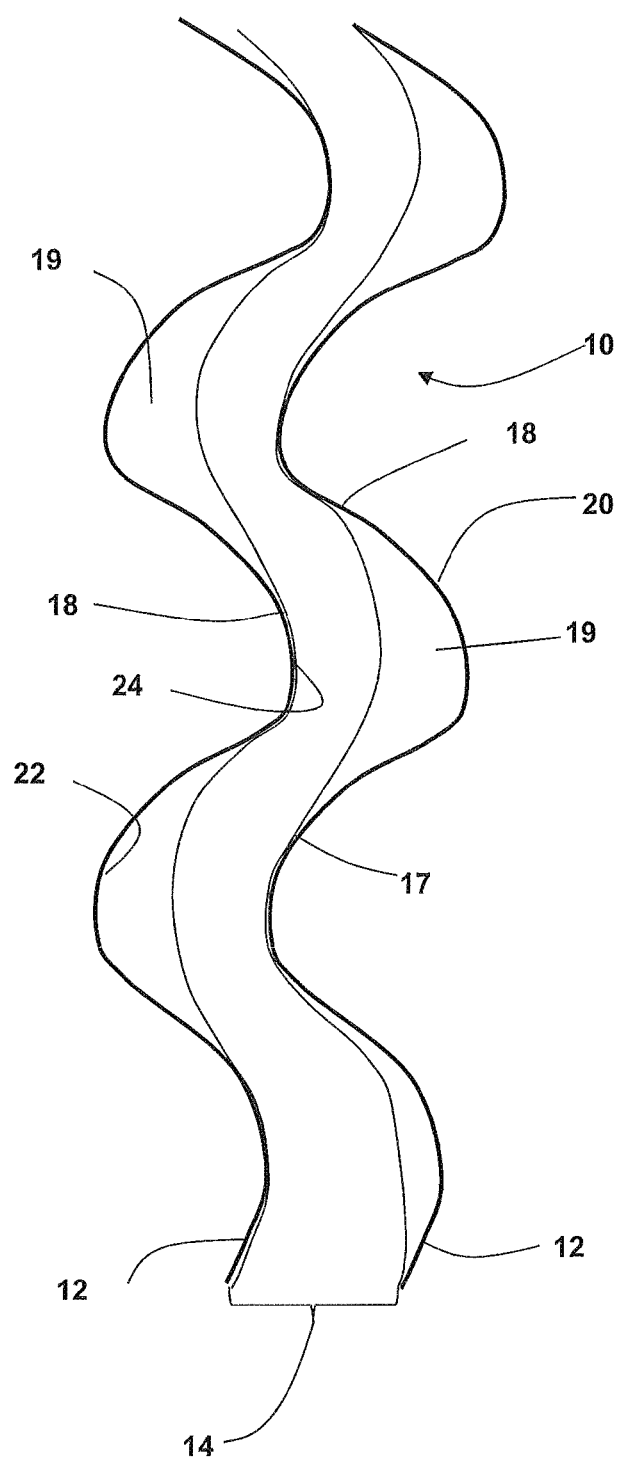
FIG. 2 is a cross-section view of the two plates of FIG. 1.

In an exemplary embodiment shown in FIG. 1, a gas liquid separator 10 comprises a plurality of plates 12. The plurality of corrugated plates 12 include two plates 12 that are mutually parallel and spaced apart so as to form a flow channel 14 there between through which a gas liquid mixture flows in a main flow direction. The main flow direction is defined as the bulk flow direction as it flows between the plates 12. This flow direction is typically shorter than a routed defined by a midpoint between the plates 12, as can be seen in FIG. 2. As a result, stagnant zones 19 are created between a separation point 17, where the main flow detaches from a surface of the plate 12, and a reattachment point 18, where the main flow re-attaches to a surface of the plate 12.

The corrugated plates 12 each have a plurality of corrugations wherein the curvature of the corrugations define an intrados surface 22 and an extrados surface 24 wherein the intrados surface 22 is defined as the internal curvature of the corrugation corresponding to a concave area of the plate 12, while the extrados surface 24 is defined as the external curvature of the corrugation corresponding to a convex area of the plate 12.

In an exemplary embodiment shown in FIG. 1 either or both the intrados surface 22 and the extrados surface 24 include grooves 26 that are aligned orthogonal to the main gas flow direction and are further configured as drainage grooves for removing liquid collected in the stagnant zone 19.

In an exemplary embodiment, at least one of the corrugations 20 has an extrados wing profile shaped camber. As shown in FIG. 2, in a further exemplary embodiment, extrados wing profile shaped cambers forming the corrugations 20 join such that in the main gas flow direction the plurality of plates 12 are free of straight sections. This can be achieved by a given surface of a plate 12, in the direction of main gas flow, transitioning from an intrados surface 22 exposed to a separated flow to an extrados surface 24 exposed to attached flow back to an intrados surface 22, or vice versa, between ends of the gas liquid separator 10.

An effect of the extrados wing profile shaped camber of corrugations is that the shape can trigger separation of the main flow at a separation point 17 further along the plate 12 than would otherwise occur if the corrugations 20 comprised fixed radius curved joined by straight portions or else comprise sinusoidal curves. This can have the consequence that if any re-entrainment occurs at the separation point 17, the injected droplets will be directed towards the steam stagnation zones, where the gravitational forces are stronger than the shear forces exerted by the separated flow to the water film deposited on the surfaces of the plates 12 thus assisting in drainage of liquid further enhanced, in an exemplary embodiment, by drainage grooves 26. In addition, the delayed separation point 17 can reduced pressure losses resulting in a reduction of the overall energy to flow a gas liquid mixture through the separator 10.

The separation point 17 can be further delayed based on the known principle that a turbulent boundary layer is less likely to separate than a laminar one by using grooves 26 which increase the turbulence of the boundary layer. As a consequents of the grooves 26, the pressure loss of the flow channel 14 can be minimized compared to the same kind of plates 12 without grooves 26. The more the flow remains attached to the surface of a plate 12, the smaller the stagnation zone and consequently the lower the losses.

Although the disclosure has been herein shown and described in what is conceived to be the most practical exemplary embodiment, the present disclosure can be embodied in other specific forms. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

The invention claimed is:

1. A gas liquid separator for separating liquid droplets from a gas flowing generally in a main gas flow direction through the gas liquid separator, the gas liquid separator comprising:
   a plurality of plates, mutually parallel and spaced apart to form a flow channel therebetween, each plate of the plurality of plates having a plurality of corrugations, wherein at least one of the corrugations comprises an intrados wing profile shaped camber followed by an extrados wing profile shaped camber;
   wherein the at least one of the corrugations includes an intrados surface and an extrados surface, the extrados surface defining an airfoil configuration;
   wherein the plurality of plates include drainage grooves, orthogonal to the main gas flow direction;
   wherein at least some grooves of the plurality of grooves are on the extrados surface and are further configured to increase energy of a turbulent boundary layer on the extrados surface; and
   wherein the corrugations do not include sinusoidal curves and do not include curves joined by straight sections.

2. The gas liquid separator of claim 1, wherein the corrugations comprise the extrados wing profile shaped camber followed by an intrados wing profile shaped camber.

3. The gas liquid separator of claim 1, wherein the plurality of plates comprises multiple drainage grooves aligned orthogonal to the main gas flow direction.

4. The gas liquid separator of claim 1, configured as a steam water separator.

5. The gas liquid separator of claim 1, wherein:
   at least some of the grooves of the plurality of grooves are on an apex of the extrados surface.

6. The gas liquid separator of claim 1, wherein:
   at least some of the grooves of the plurality of grooves are on the intrados surface.

7. The gas liquid separator of claim 1, wherein:
   the plurality of plates are free of straight sections in the main gas flow direction.

8. The gas liquid separator of claim 1, wherein:
   the extrados wing profile shaped camber of the at least one of the corrugations has a non-fixed radius.

9. A gas liquid separator for separating liquid droplets from a gas flowing generally in a main gas flow direction through the gas liquid separator, the gas liquid separator comprising:
   a plurality of plates, mutually parallel and spaced apart to form a flow channel therebetween, each plate of the plurality of plates having a plurality of corrugations, wherein at least one of the corrugations comprises an intrados wing profile shaped camber followed by an extrados wing profile shaped camber, and wherein the plurality of plates are free of straight sections in the main gas flow direction and are free of sinusoidal curves;
   stagnant zones that are created between a separation point, where a main gas flow detaches from a surface of each of the plurality of plates, and a reattachment point, where the main gas flow re-attaches to a surface of each of the plurality of plates; and a plurality of grooves arranged in close association with one another and extending orthogonal to the main gas flow direction, the plurality of grooves being configured and positioned so as to increase energy of a turbulent boundary layer on the extrados wing profile shaped camber prior to the separation point; and wherein the at least one of the corrugations includes an intrados surface and an extrados surface, the extrados surface defining an airfoil configuration.

10. A gas liquid separator for separating liquid droplets from a gas flowing generally in a main gas flow direction through the gas liquid separator, the gas liquid separator comprising:

a plurality of plates, mutually parallel and spaced apart to form a flow channel therebetween, each plate of the plurality of plates having a plurality of corrugations, wherein at least one of the corrugations comprises an intrados wing profile shaped camber followed by an extrados wing profile shaped camber, the extrados wing profile shaped camber having a radius that increases moving from a leading edge in a downstream direction of the main gas flow;

wherein the at least one corrugation includes an intrados surface and an extrados surface, the extrados surface defining an airfoil configuration;

wherein the shape of the extrados wing profile shaped camber is configured to trigger separation of the main flow at a separation point further along the corrugation than would occur if the corrugation had a fixed radius curve or sinusoidal curve.

* * * * *